(12) United States Patent
Blanchard et al.

(10) Patent No.: US 8,672,323 B2
(45) Date of Patent: Mar. 18, 2014

(54) TRANSPORTATION DEVICE OF A SHEET AND CORRESPONDING USE

(75) Inventors: Alain Blanchard, Gouvieux (FR); Jean-Francois Robert, Creil (FR)

(73) Assignee: Goss International Montataire SA, Montataire (FR)

( * ) Notice: Subject to any disclaimer, the term of this patent is extended or adjusted under 35 U.S.C. 154(b) by 0 days.

(21) Appl. No.: 13/301,963

(22) Filed: Nov. 22, 2011

(65) Prior Publication Data

US 2012/0255836 A1 Oct. 11, 2012

(30) Foreign Application Priority Data

Nov. 24, 2010 (FR) ...................................... 10 59671

(51) Int. Cl.
*B65H 5/08* (2006.01)
*B65G 39/16* (2006.01)
(52) U.S. Cl.
USPC ........... 271/276; 271/196; 271/197; 271/275; 198/689.1; 198/810.03; 198/806; 198/807
(58) Field of Classification Search
USPC ......... 271/90, 91, 94, 99, 103, 196, 197, 194, 271/275, 276; 198/689.1, 810.03, 806, 807
See application file for complete search history.

(56) References Cited

U.S. PATENT DOCUMENTS

| 3,623,719 | A | * | 11/1971 | Dokoupil et al. | ............... | 271/12 |
| 3,701,412 | A | * | 10/1972 | Wriedt | ........................ | 198/689.1 |
| 3,961,784 | A | * | 6/1976 | Sevak et al. | ..................... | 271/94 |
| 6,494,452 | B1 | * | 12/2002 | Karasiewicz | ................. | 271/276 |

FOREIGN PATENT DOCUMENTS

DE 4017147 A1 1/1991

* cited by examiner

*Primary Examiner* — Leslie A Nicholson, III
(74) *Attorney, Agent, or Firm* — Davidson, Davidson & Kappel, LLC

(57) ABSTRACT

A substrate sheet transporting device is provided. The device includes a first transfer cylinder defining a first axis, a circumferential direction and a transverse direction and a transfer belt (74) extending around the first transfer cylinder. The first transfer cylinder includes first openings for the passage of a gas and the transfer belt includes second openings for the passage of a gas. The transfer belt and the first transfer cylinder define an alignment position in which the second passage openings are aligned with the first passage openings. The transfer device includes a device for adjusting the position of the transfer belt relative to the first transfer cylinder by bringing the transfer belt toward the alignment position. The invention is applicable to cutting devices of rotary printing presses.

16 Claims, 7 Drawing Sheets

TRANSPORTATION DEVICE OF A SHEET AND CORRESPONDING USE

This claims the benefit of French Patent Application FR 10 59671, filed Nov. 24, 2010 and hereby incorporated by reference herein.

The present invention relates to a substrate sheet transporting device, of the type including:

a first transfer cylinder defining a first axis, a circumferential direction and a transverse direction;

a transfer belt extending around the first transfer cylinder.

BACKGROUND

Known in the state of the art are devices for transporting printed products such as sheets of paper. These transport devices are for example used in offset printing presses to transport the printed sheets.

These transport devices comprise hollow conveyor rollers having a transport surface in contact with the sheet to be conveyed.

In order to make the sheet stick on the conveyor roller, the latter has recesses connected to a vacuum device.

SUMMARY OF THE INVENTION

It is an object of the present invention to improve the sheet transfer quality, using simple means.

The present invention provides a transfer device, of the aforementioned type, characterized in that the first transfer cylinder includes first openings for the passage of a gas and the transfer belt comprises second openings for the passage of a gas, and the transfer belt and the first transfer cylinder define an alignment position that is a relative position of the transfer belt in relation to the first transfer cylinder in which the second passage openings are aligned with the first passage openings, and the transfer device includes means for adjusting the position of the transfer belt relative to the first transfer cylinder adapted to bring the transfer belt toward the alignment position.

According to other specific embodiments, the transport device includes one or more of the following features:

the transfer device includes a second transfer cylinder, defining a second axis, and the transfer belt extends around said second transfer cylinder;

the alignment position comprises a circumferential alignment position, and the adjustment means include circumferential adjustment means adapted to bring the transfer belt toward the circumferential alignment position;

the circumferential adjustment means comprise circumferential determination means adapted to determine the actual circumferential position of the transfer belt relative to the actual circumferential position of the first transfer cylinder and to generate, from these circumferential positions, a signal indicating a circumferential offset of the transfer belt and the first transfer cylinder relative to the circumferential alignment position;

the circumferential determination means comprise a belt sensor, in particular a camera adapted to capture an image of the transfer belt, and a first transfer cylinder sensor, in particular an encoder connected to the first transfer cylinder;

the circumferential adjustment means comprise either means for shifting the second transfer cylinder in translation relative to the first transfer cylinder, or means for adjusting the relative circumferential speed between the first transfer cylinder and the second transfer cylinder;

the alignment position comprises a lateral alignment position, and in that the adjustment means comprise lateral adjustment means adapted to bring the transfer belt toward the lateral alignment position;

the lateral adjustment means comprise lateral determination means adapted to determine the actual lateral position of the transfer belt relative to the first transfer cylinder and to generate, from said determined lateral position, a signal indicating a lateral offset of the transfer belt and the first transfer cylinder relative to the lateral alignment position;

the lateral adjustment means comprise angular offset means for the second transfer cylinder relative to the first transfer cylinder;

the transfer device comprises means for lateral centering of the transfer belt relative to the first transfer cylinder, in particular these centering means comprise a curved surface of the or each transfer cylinder or lateral clips of the or each transfer cylinder;

the transfer belt includes at least one longitudinal sheet area that is made up of the upstream portion, a middle portion, and a downstream portion; and at least the upstream portion and/or the downstream portion is/are provided with second gas passage openings defining a gas surface permeability of the upstream/downstream portion and the gas surface permeability of the upstream portion and/or the downstream portion is/are greater than the gas surface permeability of the middle portion.

The invention also relates to the use of a device for transferring a substrate sheet as defined above, comprising the following successive steps:

driving the first transfer cylinder at a cylinder speed, determining the actual position of the first passage openings, determining the actual position of the second passage openings, modifying the relative position of the transfer belt in relation to the first transfer cylinder by aligning the second gas passage openings with the first gas passage openings.

According to one particular embodiment, the use includes the following feature: the modification is a lateral and/or circumferential modification.

BRIEF DESCRIPTION OF THE DRAWINGS

The invention will be better understood upon reading the following description, provided solely as an example and done in reference to the appended drawings, in which.

DETAILED DESCRIPTION

Figure 1:
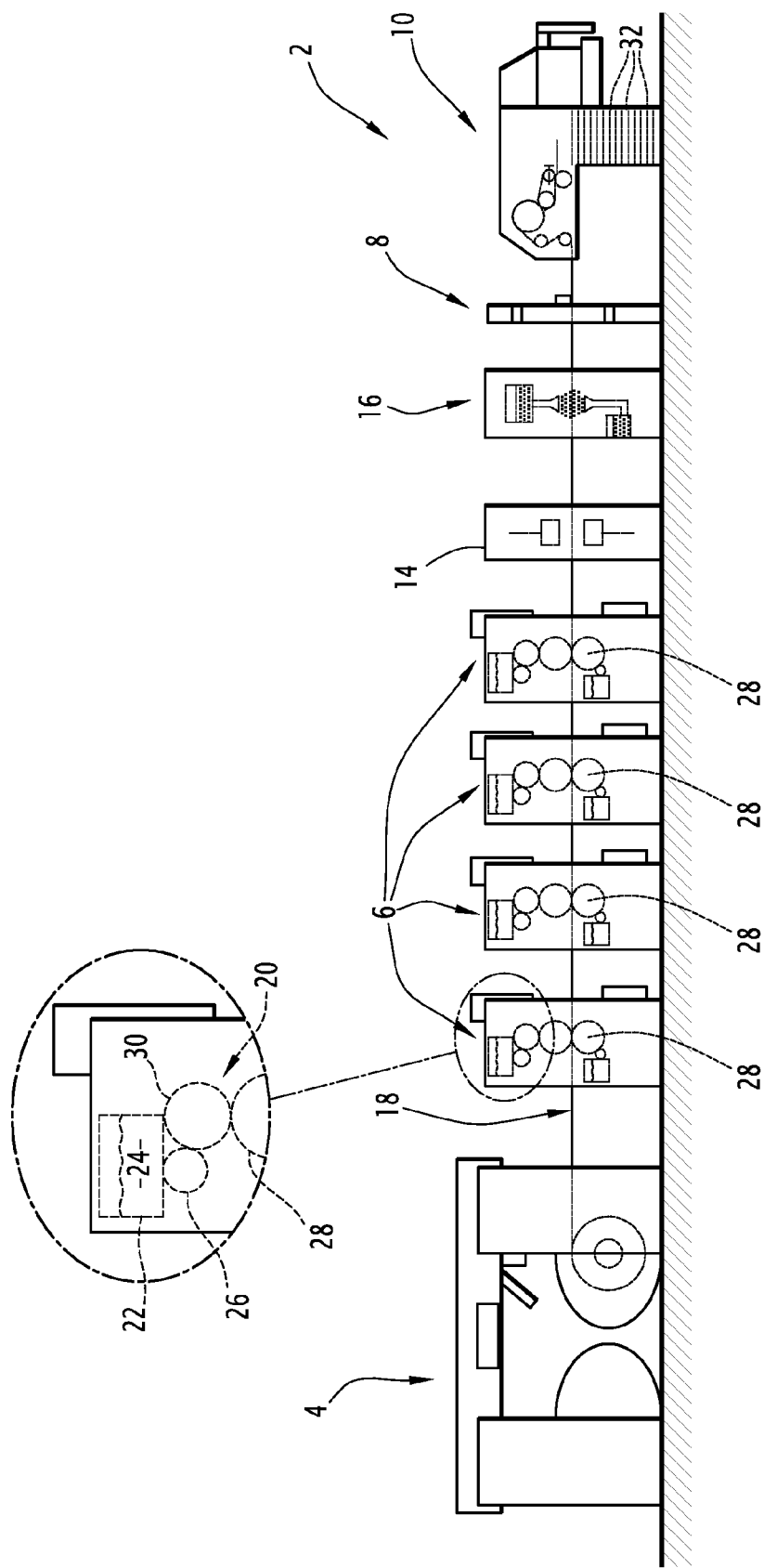
FIG. 1 is a diagrammatic side view of a printing press according to the invention.

FIG. 1 shows a rotary printing press according to the invention, designated by general reference 2.

The printing press 2 comprises an unwinder 4, four printing units 6, a traction device 8, and a cutting and stacking device 10. The cutting and stacking device 10 is, in the case at hand, a cutting, transfer, and stacking device 10. The printing press 2 also comprises a strip grasping device 14 and a chalking device 16.

The printing press 2 may comprise any number of printing units 6, in theory, from one to n.

The unwinder 4 is adapted to unwind a continuous print strip 18.

The print strip 18 is a strip of coated paper. Coated paper is paper that comprises a coating layer, for example kaolin or chalk, improving the mechanical or optical properties of the paper. Alternatively, it is possible for the paper strip to be a strip of uncoated paper.

The printing press 2 defines a printing path for the strip 18 between the unwinder 4, through the printing units 6, the strip grasping device 14, the chalking device 16, and the traction device 8, as far as the cutting and stacking device 10.

Each printing unit 6 includes an inking device 20 which is provided with an ink tank 22 comprising ink 24 provided to print on a strip of paper 18. Each inking device 20 comprises an ink transfer roller 26 for transferring ink 24 to print rolls 28 (see below), via a plate cylinder 30. The printing press 2 is therefore an offset printing press.

The printing units 6 comprise these print rollers 28 that are adapted to print on the strip of paper 18.

The cutting and stacking device 10 is adapted to cut the paper strip 18 into individual sheets 32 and to produce a stack of individual cut sheets.

The traction device 8 is situated downstream of the printing unit 6 furthest downstream, and upstream of the cutting and stacking device 10. This traction device 8 is adapted to apply a particular mechanical tension on the strip 18 leaving the printing unit 6 furthest downstream.

This strip grasping device 14 is adapted to detect a break in the paper strip 18 and to grasp the free end of the paper strip 18 in that case.

The chalking device 16 is adapted to deposit offset powder on each surface of the printed strip 18. It can deposit offset powder on one or both surfaces of the printed strip 18. The powder used to chalk this strip is a corn-based vegetable powder or a mineral powder.

The traction device 8, associated with the other units of the press, makes it possible to print a paper strip and receive it in the cutting and stacking device 10, without drying said strip of paper 12 and by evaporation of the ink solvents.

The image is printed using ink 24 comprised in an ink tank 22. Advantageously, the ink 24 is a siccative ink, or a waterless ink, or a bi-component ink. The drying of siccative inks is the combination of a first phenomenon called "penetration in the medium" and a second phenomenon called "oxidative polymerization of varnishes made up of oils and resins."

Waterless inks are used with specific printing plates making it possible to define unprinted areas without using the traditional lithography method based on the rejection of greasy ink by a previously moistened hydrophilic surface. Using these inks may be considered in the same ways as the traditional siccative inks previously discussed and makes it possible to do away with a dryer, or to design it in a less bulky matter.

Figure 2:
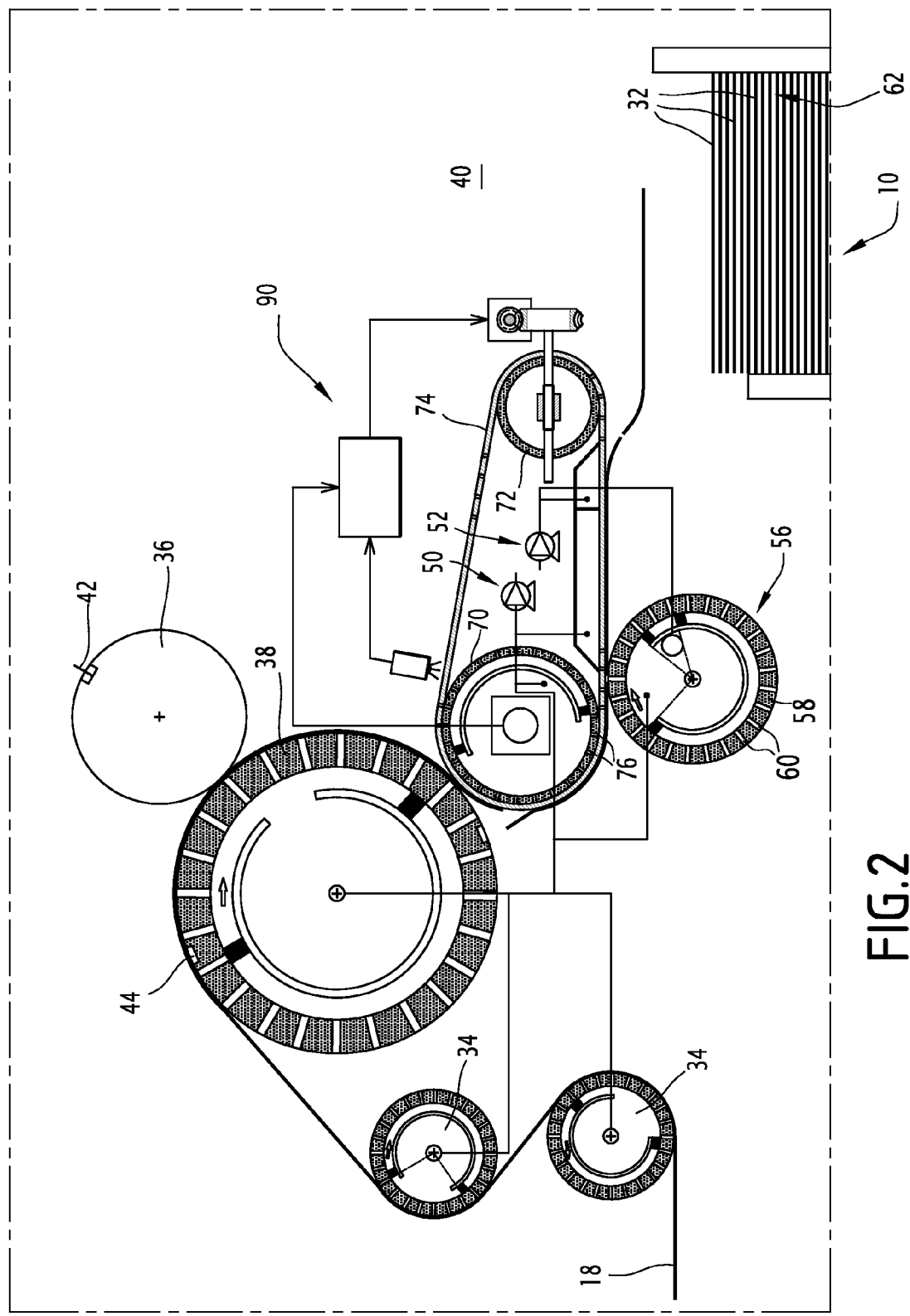
FIG. 2 is a diagrammatic side view of the cutting and stacking device according to a first embodiment of the invention.

FIG. 2 diagrammatically illustrates the cutting and stacking device 10.

The cutting and stacking device 10 includes two feed rollers 34, a cutting cylinder 36, and an impression cylinder 38.

The cutting and stacking device 10 includes a fixed structure 40 or frame.

The feed rollers 34 are positioned upstream of the cutting cylinder 36 and the impression cylinder 38. The two feed rollers 34 are mobile in rotation. Each of the feed rollers 34 includes an enclosure having through holes.

The cutting cylinder 36 includes a blade 42 and is mobile in rotation.

The impression cylinder 38 is mobile of rotation and includes impression blocks 44 cooperating with the blade 42, so as to cut the paper strip 18 into sheets 32.

The cutting device 10 also includes a depression or vacuum device 50 adapted to create a depression or vacuum, and a pressure device 52.

The cutting and stacking device 10 includes a transfer device 54 and a placement device 56.

The transfer device 54 is adapted to grasp a sheet 32 from the impression cylinder 38 and transfer it to the placement device 56.

The placement device 56 includes a placement cylinder 58 able to rotate around an axis. The placement cylinder 58 includes openings 60.

The cutting device 10 defines a path of the paper strip 18 and the sheets 32 extending from the inlet of said device 10 successively over the feed rollers 34, the impression cylinder 38, the transfer device 54, the placement cylinder 58, as far as a stack 62 of individual sheets 32.

The transfer device 54 will be described in more detail below, in particular in reference to FIG. 3. The transfer device 54 comprises a first transfer cylinder 70, a second transfer cylinder 72, and a transfer belt 74. The transfer belt 74 extends around the first transfer cylinder 70 and around the second transfer cylinder 72.

The first transfer cylinder 70 includes first passage openings for a gas 76. The first gas passage openings 76 are positioned on the outer surface of the first transfer cylinder 70 at a circumferential distance DCC from one another. The gas passage openings 76 are positioned at regular intervals DCC over the entire circumference of the first transfer cylinder 70.

Figure 4:
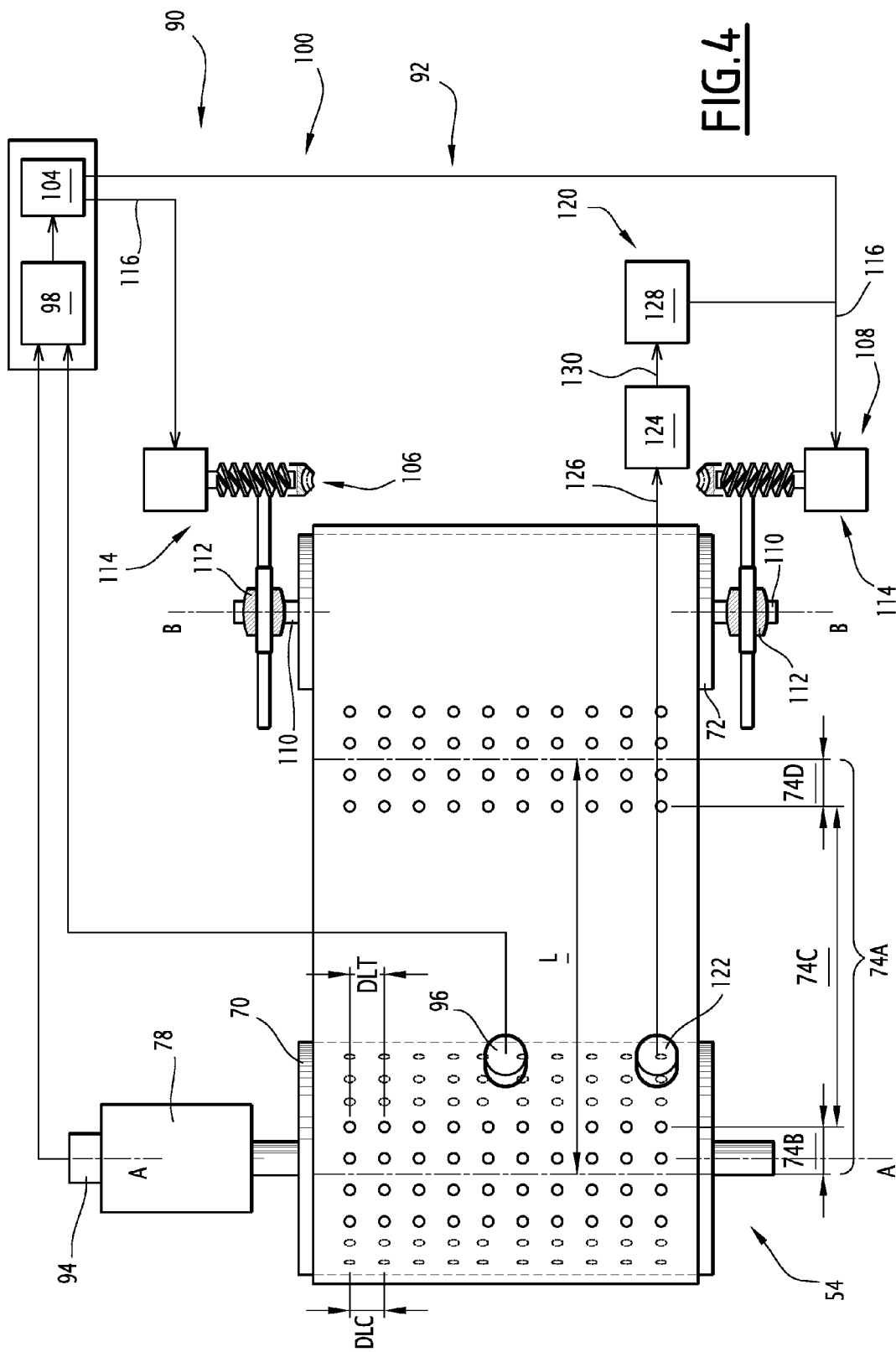
FIG. 4 is a top view of the transfer device of FIG. 3.

The first gas passage openings 76 are positioned on the outer surface of the first cylinder 70 at a lateral distance DLC from one another (FIG. 4).

The first transfer cylinder 70 defines a circumferential direction extending around axis A-A and a transverse direction extending along axis A-A. The first transfer cylinder 70 is mobile in rotation around an axis of rotation A-A. The first transfer cylinder 70 is rotated by a drive motor 78.

The transfer device 54 also comprises means for creating a vacuum 80 or depression in part of the first gas passage openings 76. In the case at hand, these vacuum creation means 80 comprise the depression device 50.

These vacuum creation means 80 comprise a vacuum chamber 82 extending to the inside of the transfer cylinder 70 from an engagement area situated opposite the cylinder 38 to a detachment area. The engagement area is the location in which the sheet 32 is removed from the cylinder 38 and engaged by the transfer belt 74. In the detachment area, the transfer belt 74 detaches from the first transfer roller 70. This detachment area is situated adjacent to a vacuum box 130 (see below). In other words, the first transfer cylinder 70 and the vacuum creation means 80 are adapted to create a vacuum in the gas passage openings 76 positioned on a vacuum area extending over an angular sector around axis A-A. The angular sector has an expanse of less than 180°.

The vacuum creation means 80 comprise a vacuum pump 84 connected to the vacuum chamber 82.

The transfer belt 74 is an endless belt. The transfer belt 74 has a circumferential length that is a whole multiple of the length L of a sheet 32 to be transferred. In the case at hand, the circumferential length of the belt is 4L.

The transfer cylinder 72 acts as a stretch roll of the belt 74.

The transfer belt 74 extends around the transfer cylinders 70, 72.

The transfer belt 74 comprises a plurality of gas passage openings 86, also called second passage openings 86. The circumferential distance DCT between the gas passage openings 86 is identical to distance DCC.

The circumferential length of the belt 74 is a whole multiple of distance DCC. The lateral distance DLT between the gas passage openings 86 is identical to distance DLC.

In this way, the transfer belt 74 and the first transfer cylinder 70 define an alignment position that is a relative position of the transfer belt in relation to the first transfer cylinder 70 in which the gas passage openings 86 are aligned with the gas passage openings 76. In this alignment position, the vacuum that is created by the vacuum creation means 80 sections a sheet 32 against the surface of the transfer belt 74 and ensures that the sheet 32 is maintained against the transfer belt, at least over the vacuum area.

The alignment position is divided into a circumferential alignment position and a lateral alignment position.

The transfer device 54 comprises adjustment means 90 adapted to adjust the position of the transfer belt 74 in relation to the first transfer cylinder 70 and adapted to bring the transfer belt 74, relative to the first transfer cylinder 70, toward or into the alignment position, automatically when the transfer belt 74 and the first transfer cylinder 70 are offset from the alignment position.

To that end, the adjustment means 90 include circumferential adjustment means 92 adapted to adjust the position of the transfer belt 74 relative to the first transfer cylinder 70 in the circumferential direction. The circumferential adjustment means 92 are adapted to bring the transfer belt 74, relative to the first transfer cylinder 70, into the circumferential alignment position, automatically when the transfer belt 74 and the first transfer cylinder 70 are offset from the circumferential alignment position.

The circumferential adjustment means 92 comprise circumferential determination means adapted to determine the actual circumferential position of the transfer belt 74 relative to the actual circumferential position of the first transfer cylinder 70.

These circumferential determination means comprise, on the one hand, an encoder 94 determining the speed of rotation or the absolute rotary position of the first transfer cylinder 70. The circumferential determination means also comprise an optical sensor, in particular a camera 96 adapted to capture an image of the transfer belt.

These circumferential determination means comprise a control module 98 adapted to generate an output signal from the signals of the encoder 94 and the camera 96, and representing the circumferential offset between the transfer belt 74 and the first transfer cylinder 70 from the circumferential alignment position. This offset is the angular offset or the smallest circumferential distance between the second openings 86 and the first openings 76. In FIGS. 3 and 4, the circumferential offset is 0, the transfer belt 74 and the first transfer cylinder 70 being in their circumferential alignment position.

Alternatively, the encoder 94 can be replaced by another cylinder sensor adapted to read the circumferential position of the first transfer cylinder 70. Likewise, the camera 96 can be replaced by another belt sensor adapted to read the circumferential position of the transfer belt.

The circumferential adjustment means 92 also comprise circumferential offset means of the transfer belt 74 relative to the first transfer cylinder 70. These circumferential offset means comprise translation offset means 100 of the second transfer cylinder 72, as a function of the output signal of the control module 98.

The second transfer cylinder 72 is mobile to rotate around axis B-B. Axes A-A and B-B extend in a plane of axes P-P.

The translation offset means 100 are adapted to offset the second transfer cylinder 72 in translation relative to the first transfer cylinder in the plane of axes P-P.

The translation offset means 100 comprise a control module 104, which is a circumferential control module, as well as first 106 and second 108 support devices. The control module 104 is adapted to enslave the first 106 and second 108 support devices.

The second transfer cylinder 72 includes an axis tip 110 at each of its ends. Each of the support devices 106 and 108 is adapted to offset the associated axis tip 110 in translation perpendicular to axis A-A. To that end, each support device 106, 108 comprises a spherical element 112 housed in rotation in the associated arbor tip 110 and an actuator 114 connected to the control module 104 by a control line 116.

In order to offset the second transfer cylinder 72 in translation relative to the first transfer cylinder 70, the control module 104 simultaneously actuates the actuators 114 so that the axis tips are driven at the same speed, and in the same direction.

The control module 104 and the actuators 114 are therefore means for adjusting the relative circumferential speed between the first transfer cylinder and the second transfer cylinder.

The adjustment means 90 also comprise lateral adjustment means 120 adapted to move the transfer belt 74 relative to the first transfer cylinder 70 in the lateral direction, automatically when the transfer belt 74 and the first transfer cylinder 70 are offset from the lateral alignment position. The lateral adjustment means 120 comprise lateral determination means adapted to determine the actual lateral position of the transfer belt 74 relative to the first transfer cylinder 70. These lateral determination means are for example provided with a sensor 122.

The lateral determination means also comprise a monitoring module 124. The sensor 122 is connected to the monitoring module 124 by a signal line 126 and is adapted to transmit a signal representing the actual lateral position of the belt to the monitoring module 124.

The monitoring module 124 is adapted to generate a signal indicating a lateral offset of the transfer belt 74 and the first transfer cylinder 70 relative to the lateral alignment position.

The lateral adjustment means 120 also comprise angular offset means for the second transfer cylinder 72 in relation to the first transfer cylinder 70. In the case at hand, the angular offset means comprise the support device 108 associated with a single one of the tips 110 as well as a control module 128, which is adapted to generate a signal indicating the offset between the lateral reference position of the transfer belt 74 in relation to the first transfer cylinder and the actual lateral position. To that end, the control module 128 receives the signal generated by the monitoring module 124 through a line 130.

In order to angularly offset the second transfer cylinder 72 relative to the first transfer cylinder 70, the control module 128 creates and sends a control signal to the actuator 114 of the support device 108, preferably through the control line 116. The angular offset is an angular offset around an axis perpendicular to the plane of axes P-P defined by axes A-A and B-B. In the event the first transfer cylinder 70 and the transfer belt are in the lateral alignment position, the actuator 114 of the support device 108 is controlled so that axes A-A and B-B are parallel.

Figure 3:
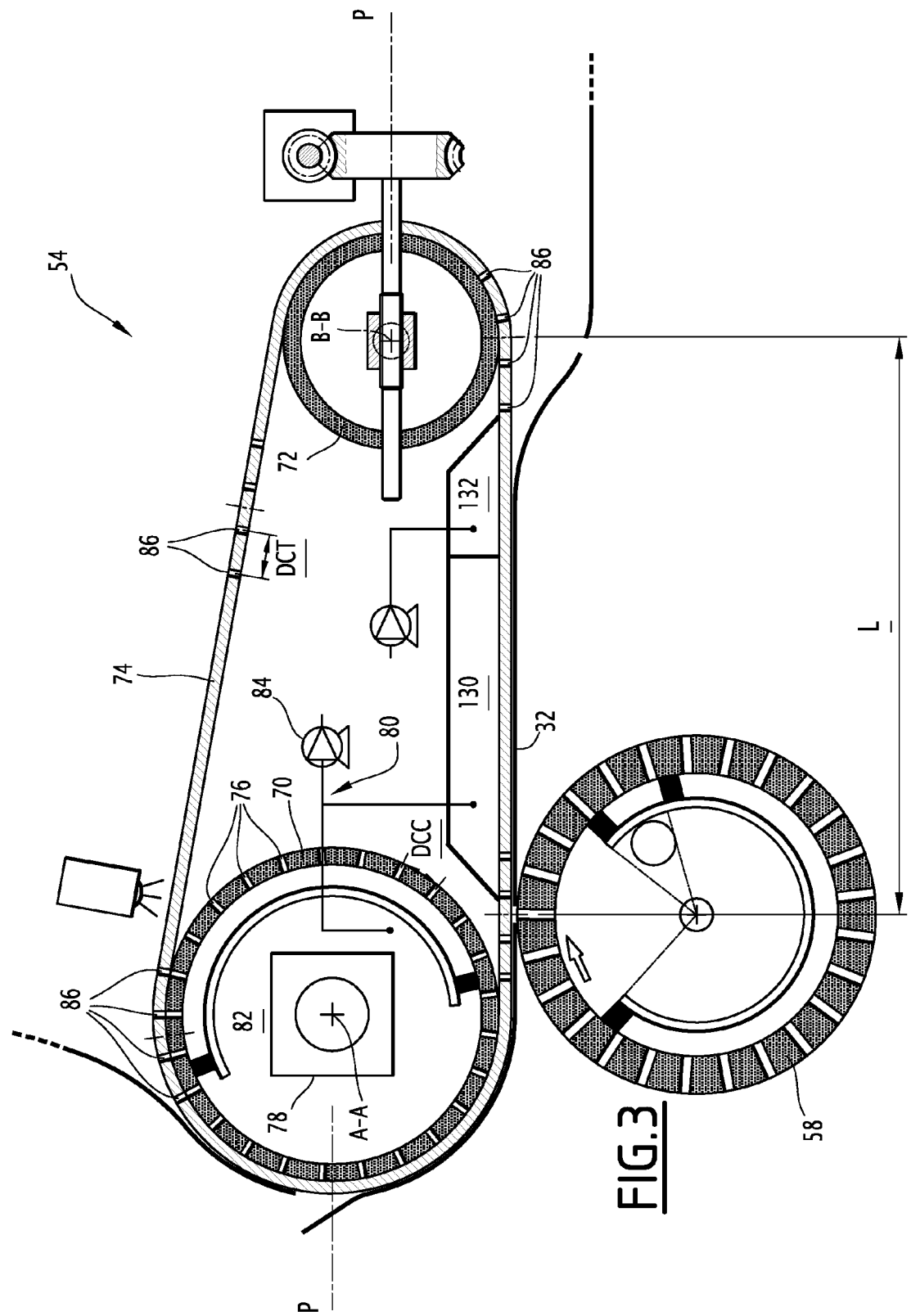
FIG. 3 is an enlarged view of the detail of FIG. 2, showing a transfer device of the cutting and stacking device.

Furthermore, in reference to FIG. 3, the transfer device 54 includes a vacuum box 130 adapted to create a vacuum in the openings 86 at a location positioned between the transfer cylinders 70 and 72. The vacuum box 130 is connected to the vacuum device 50.

The transfer device 54 also comprises a blower box 132 adapted to create an overpressure and a gas stream tending to move the sheet 32 away from the transfer belt 74. The blower box 132 is positioned adjacent to the vacuum box 130 and the transfer cylinder 72. The blower box 132 is adapted to blow the sheet 32 away from the transfer belt 74 toward the placement device 56 or toward the stack 62. More specifically, the blower box 132 is adapted to blow only the head of the sheet toward the stack 62.

Alternatively, the suction box 130 and the blower box 132 may be omitted.

The placement device 56 is adapted to slow the downstream portion of the sheet.

The transfer belt 74 includes a longitudinal sheet area 74A. During use of the transfer device, a substrate sheet 32 extends over substantially the entire length of the longitudinal sheet area 74A. The longitudinal sheet area 74A is made up of an upstream portion 74B, a middle portion 74C, and a downstream portion 74D. The upstream portion 74B and the downstream portion 74D are provided with passage openings 86. All of these passage openings 86 define a gas surface permeability for the assembly, respectively, of the upstream 74B and downstream 74D portions. The middle portion 74C is provided without passage openings 86. The gas surface permeability of each of the upstream 74B and downstream 74D portions is therefore greater than the gas surface permeability of the middle portion 74C.

The middle portion is longer than the downstream/upstream portion.

The circumferential length of the middle portion 74C is at least 50% of the length L. The circumferential length of each upstream portion 74B is at least 2% of the length L. The circumferential length of each downstream portion 74C is at least 10% of the length L.

The circumferential length of each of the upstream 74B and downstream 74C portions is comprised between 5 mm and 150 mm, and is preferably 10 mm for each upstream portion and 80 mm for each downstream portion.

In this way, only the upstream edges and the downstream edges of each sheet 32 are grasped by the transfer device 54.

The transfer device 54 according to the invention allows an efficient transfer of a sheet 32 from the cylinder 38 to the placement device 56 or the stack 62, and has significant availability. Furthermore, the transfer device 54 prevents poor conveyance of a sheet.

Figure 5:
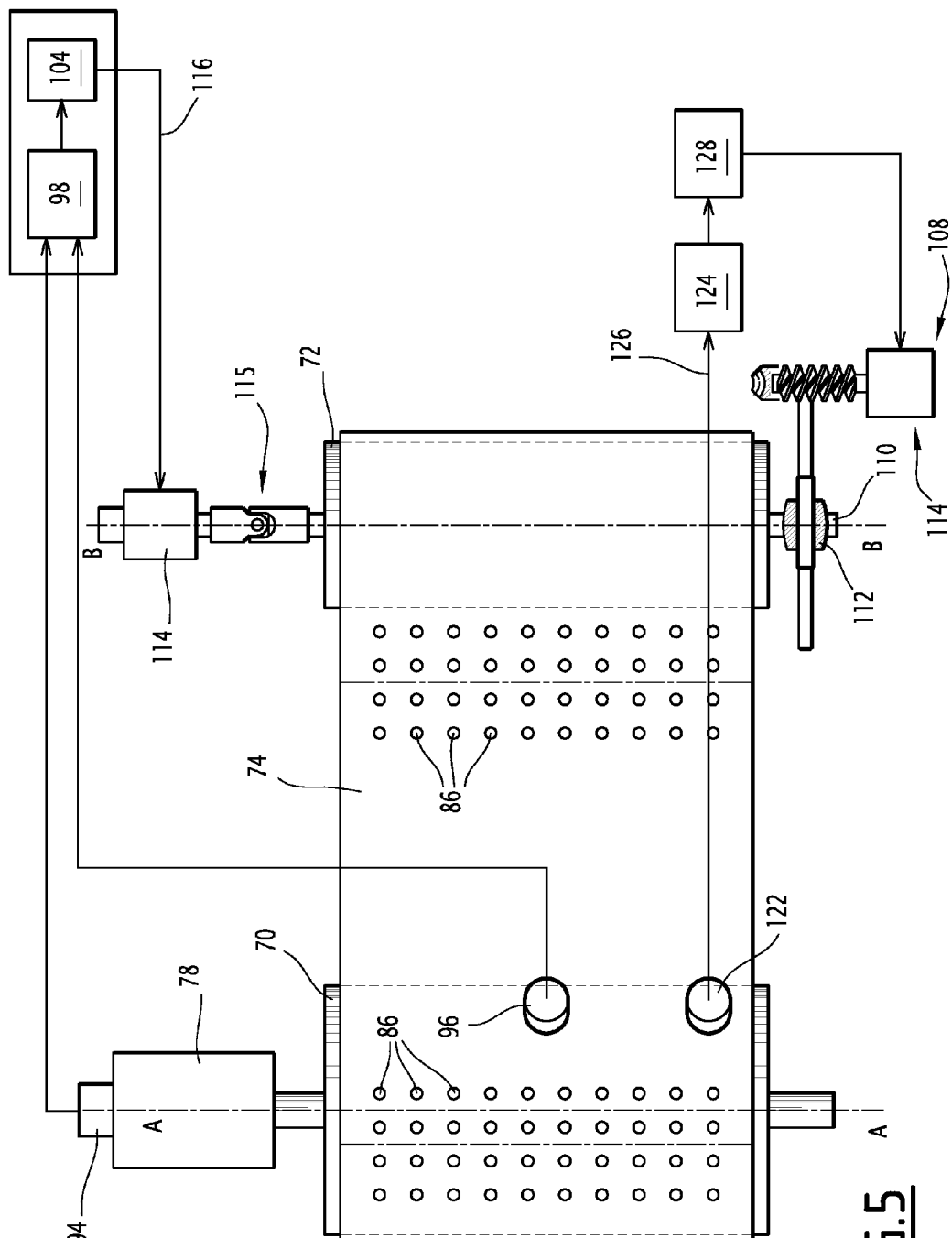
FIG. 5 is a diagrammatic view corresponding to the view of FIG. 4, of a second embodiment of the transfer device according to the invention.

FIG. 5 shows a second embodiment of the transfer device, which differs from the previously described embodiment only as described below. Similar elements bear the same references.

The circumferential adjustment means 92 comprise a drive motor 114 of the second transfer cylinder 72. The drive motor 114 is actuated by the control module 104 through the control line 116.

The support device 106 has been omitted.

When no circumferential offset of the transfer belt 74 relative to the transfer cylinder 70 is necessary, the drive motor 114 is driven at a speed such that the transfer cylinder 72 has a circumferential speed identical to that of the transfer cylinder 70. When the transfer belt 74 must be moved forward relative to the transfer cylinder 70 so as to bring the transfer belt 74 toward the alignment position, the motor 114 is driven so that the circumferential speed of the cylinder 72 is greater than the circumferential speed of the transfer cylinder 70. When the transfer belt 74 must be offset backwards relative to the transfer cylinder 70 so as to bring the transfer belt 74 toward the alignment position, the motor 114 is driven so that the circumferential speed of the transfer cylinder 72 is below the circumferential speed of the transfer cylinder 70.

In this way, the circumferential adjustment means comprise means for adjusting the relative circumferential speed between the first transfer cylinder and the second transfer cylinder. The circumferential speeds are respectively considered on the surface of the transfer cylinders 70, 72 on which the transfer belt 74 presses.

In order for the lateral adjustment to be possible through an angular offset of the cylinder 72 similar to the offset of the embodiment, the drive motor 114 is connected to the tip 110 using a Cardan joint 115.

Figure 6:
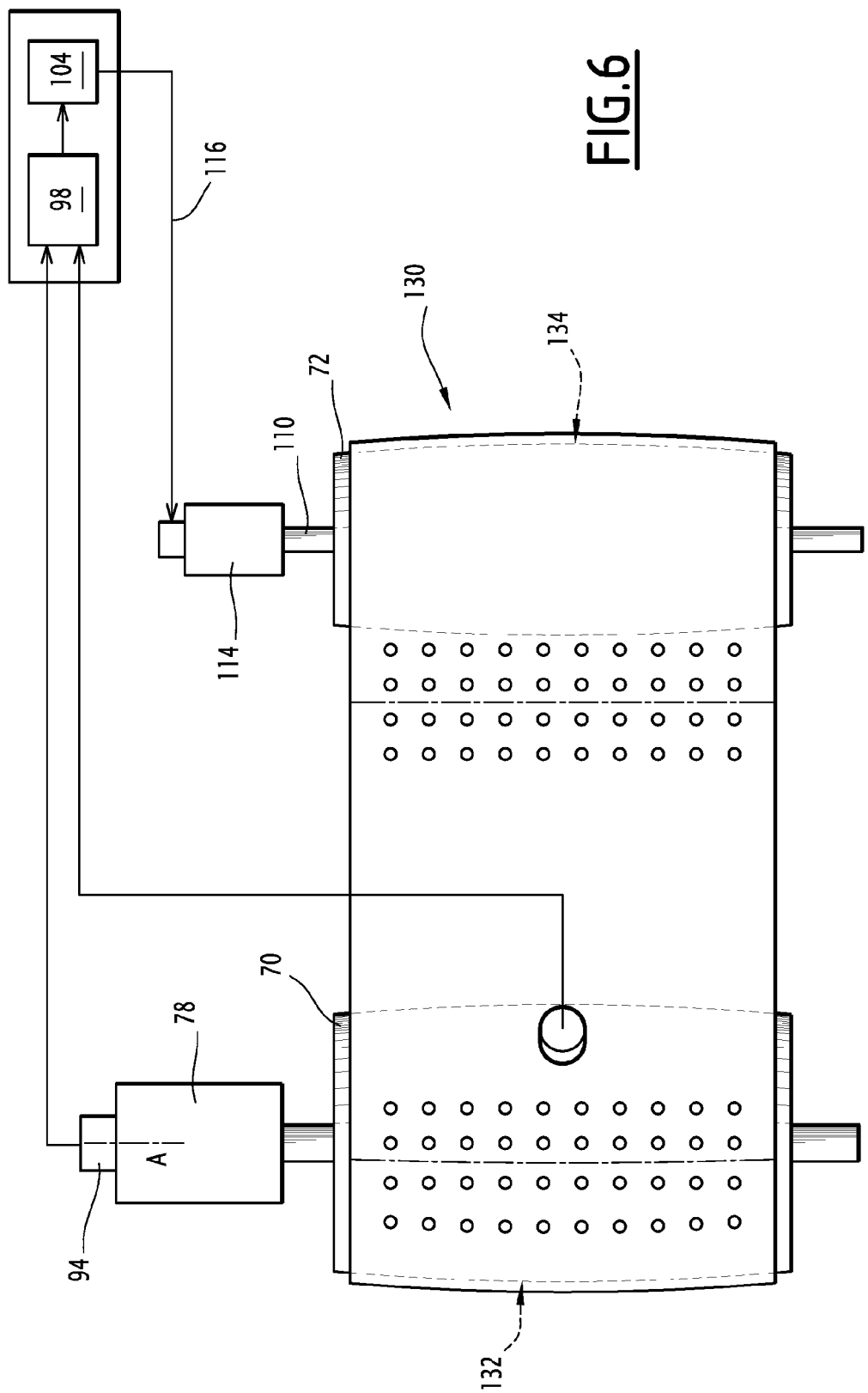
FIGS. 6 and 7 are diagrammatic views of third and fourth embodiments of the transfer device, these views corresponding to the views of FIG. 4.

FIG. 6 shows a third embodiment of the transfer device according to the invention. This embodiment differs from the second embodiment only as described below. Similar elements bear the same references.

The transfer device 54 does not comprise lateral adjustment means or angular offset means of the second transfer cylinder 72, relative to the first transfer cylinder 70, but comprises lateral centering means 130 of the transfer belt 74 relative to the first transfer cylinder 70. The lateral centering means 130 comprise curved surfaces 132, 134 of each of the transfer cylinders. Each of the curved surfaces is a convex surface. The maximum diameter of each transfer cylinder 70, 72 is situated on a median plane of the transfer cylinder. The transfer belt 74 presses on each of the curved surfaces 132, 134.

Furthermore, the drive motor 114 is fixed in rotation to the tip 110 and has no degree of rotational freedom along an axis perpendicular to plane P-P relative to the tip. In other words, the Cardan joint 115 is omitted.

Additionally, the actuator 108 has been eliminated.

The transfer device according to this third embodiment is particularly easy to manufacture and is therefore economical.

Figure 7:
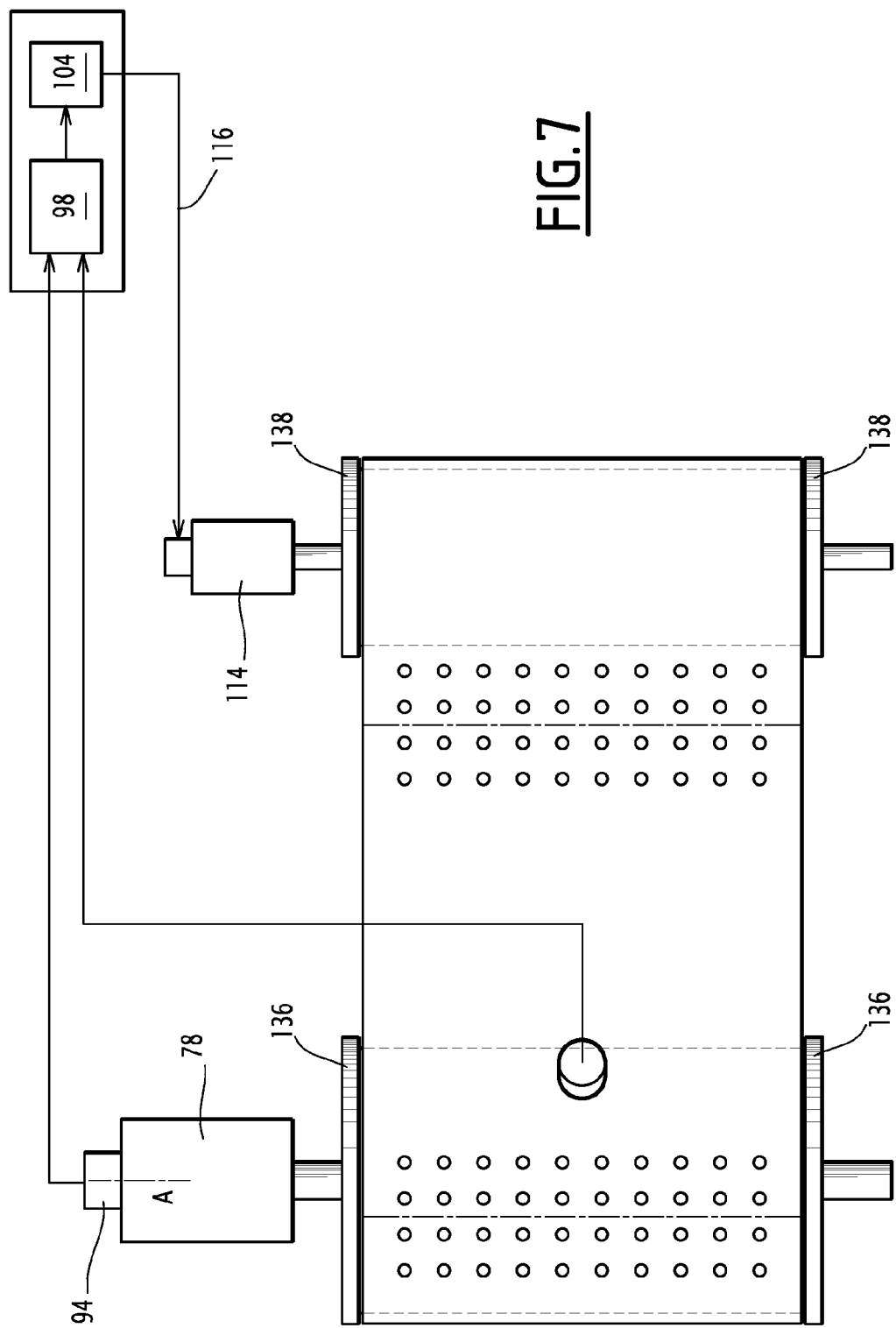

FIG. 7 shows a fourth embodiment, which differs from the third embodiment as described below. Similar elements bear the same references.

The lateral centering means of the transfer belt are not made up of curved surfaces, but of lateral clips 136, 138 of the transfer cylinders 70, 72.

In general, when the transfer belt 74 is forward (positive offset) relative to the transfer cylinder 70, i.e. when the second openings 86 must be moved backward relative to the first openings 76, the circumferential adjustment means 92 are controlled so as to obtain an increase in the elongation of the transfer belt. On the other hand, when the transfer belt 74 is late (negative offset) relative to the transfer cylinder 70, i.e. when the second openings 86 must be moved forward relative to the first openings 76, the circumferential adjustment means 92 are controlled so as to obtain a decrease in the elongation of the transfer belt.

According to other features of the invention:

The first transfer cylinder defines a transfer area adapted to transfer a sheet and extending angularly around axis A-A between an engagement area and an attachment area.

In the alignment position, the first 76 and second 86 gas passage openings are at least aligned in the transfer area.

In the alignment position, a gas, in particular air, can pass through the first and second aligned openings.

Another feature of the invention is a device for cutting a paper strip comprising a cutting cylinder 36 and an impression cylinder 38 adapted to cut a substrate strip into sheets, and a transfer device 54 adapted to transfer the sheets, the transfer device being a device as defined above.

What is claimed is:

1. A substrate sheet transporting device comprising:
a first transfer cylinder defining a first axis, a circumferential direction and a transverse direction;
a transfer belt extending around the first transfer cylinder, the first transfer cylinder including first openings for the passage of a gas and the transfer belt includes second openings for the passage of the gas, the transfer belt and the first transfer cylinder defining an alignment position, the alignment position being a relative position of the transfer belt in relation to the first transfer cylinder in which the second passage openings are aligned with the first passage openings; and
an adjuster for adjusting the position of the transfer belt relative to the first transfer cylinder adapted to bring the transfer belt toward the alignment position.

2. The transfer device as recited in claim 1 further comprising a second transfer cylinder defining a second axis, the transfer belt extending around said second transfer cylinder.

3. The transfer device as recited in claim 1 wherein the alignment position comprises a circumferential alignment position, and the adjuster include a circumferential adjustment device adapted to bring the transfer belt toward the circumferential alignment position.

4. The transfer device as recited in claim 3 wherein the circumferential adjustment device includes a circumferential position sensor adapted to determine the actual circumferential position of the transfer belt relative to the actual circumferential position of the first transfer cylinder and to generate, from the actual circumferential positions of the transfer belt and first transfer cylinder, a signal indicating a circumferential offset of the transfer belt and the first transfer cylinder relative to the circumferential alignment position.

5. The transfer device as recited in claim 4 wherein the circumferential position sensor includes a belt sensor and a first transfer cylinder sensor.

6. The transfer device as recited in claim 5 wherein the belt sensor is a camera adapted to capture an image of the transfer belt, and the first transfer cylinder sensor is an encoder connected to the first transfer cylinder.

7. The transfer device as recited in claim 3 wherein the circumferential adjustment device includes either a shifter for shifting the second transfer cylinder in translation relative to the first transfer cylinder, or a speed adjuster for adjusting the relative circumferential speed between the first transfer cylinder and the second transfer cylinder.

8. The transfer device as recited in claim 1 wherein the alignment position includes a lateral alignment position, and the adjuster includes a lateral adjustment device adapted to bring the transfer belt toward the lateral alignment position.

9. The transfer device as recited in claim 8 wherein the lateral adjustment device includes a lateral position sensor adapted to determine an actual lateral position of the transfer belt relative to the first transfer cylinder and to generate, from the determined actual lateral position, a signal indicating a lateral offset of the transfer belt and the first transfer cylinder relative to the lateral alignment position.

10. The transfer device as recited in claim 8 further comprising a second transfer cylinder defining a second axis, the transfer belt extending around said second transfer cylinder, and the lateral adjustment device includes angular offset device for the second transfer cylinder relative to the first transfer cylinder.

11. The transfer device as recited in claim 1 further comprising a centering device for lateral centering of the transfer belt relative to the first transfer cylinder.

12. The transfer device as recited in claim 11 wherein the centering device includes a curved surface of the transfer cylinder or lateral clips of the transfer cylinder.

13. The transfer device as recited in claim 1 wherein the transfer belt includes at least two longitudinal sheet areas, each longitudinal sheet area made up of an upstream portion, a middle portion, and a downstream portion,
the upstream portion or the downstream portion being provided with the second openings defining a gas surface permeability of the upstream or downstream portion,
the gas surface permeability of the upstream portion or the downstream portion being greater than the gas surface permeability of the middle portion.

14. The transfer device as recited in claim 13 wherein the at least two longitudinal sheet areas includes three longitudinal sheet areas.

15. A method for the transfer device as recited in claim 1, comprising the following successive steps:
driving the first transfer cylinder at a cylinder speed;
determining the actual position of the first openings;
determining the actual position of the second openings; and
modifying the relative position of the transfer belt in relation to the first transfer cylinder by aligning the second openings with the first gas passage openings.

16. The method as recited in claim 15 wherein the modifying step includes a lateral or circumferential modification.

* * * * *